US012397982B2

(12) United States Patent
Takeda et al.

(10) Patent No.: US 12,397,982 B2
(45) Date of Patent: Aug. 26, 2025

(54) PROTECTION SHEET, PRESS THROUGH PACKAGE

(71) Applicants: UACJ CORPORATION, Tokyo (JP); UACJ FOIL CORPORATION, Tokyo (JP)

(72) Inventors: Tomoki Takeda, Tokyo (JP); Tomohiro Maeda, Tokyo (JP)

(73) Assignee: UACJ Corporation, Tokyo (JP)

(*) Notice: Subject to any disclaimer, the term of this patent is extended or adjusted under 35 U.S.C. 154(b) by 41 days.

(21) Appl. No.: 18/566,608

(22) PCT Filed: Jun. 8, 2022

(86) PCT No.: PCT/JP2022/023080
§ 371 (c)(1),
(2) Date: Dec. 1, 2023

(87) PCT Pub. No.: WO2022/260067
PCT Pub. Date: Dec. 15, 2022

(65) Prior Publication Data
US 2024/0367887 A1    Nov. 7, 2024

(30) Foreign Application Priority Data
Jun. 8, 2021    (JP) ................................. 2021-095632

(51) Int. Cl.
*B65D 83/04*    (2006.01)
*B32B 3/26*    (2006.01)
(Continued)

(52) U.S. Cl.
CPC ............ *B65D 83/0445* (2013.01); *B32B 3/26* (2013.01); *B32B 7/06* (2013.01); *B32B 7/12* (2013.01);
(Continued)

(58) Field of Classification Search
CPC .... B32B 3/26; B32B 7/06; B32B 7/12; B32B 15/08; B32B 2250/02; B32B 2439/00;
(Continued)

(56) References Cited

U.S. PATENT DOCUMENTS 5,758,774 A * 6/1998 Leblong ............... B65D 75/327
206/532
5,785,180 A * 7/1998 Dressel ................ B65D 75/327
206/532
(Continued)

FOREIGN PATENT DOCUMENTS

DE    102011018199 A    10/2012
JP    56-48693 Y2    11/1981
(Continued)

OTHER PUBLICATIONS

Japanese Office Action corresponding to counterpart Japanese patent application No. 2021-095632 mailed Feb. 13, 2025, with English translation.
(Continued)

*Primary Examiner* — Bryon P Gehman
(74) *Attorney, Agent, or Firm* — Renner, Otto, Boisselle & Sklar, LLP

(57) ABSTRACT

A protection sheet is to be attached to a press through package that includes a sheet-shaped container including storing portions and a cover that seals the storing portions. The protection sheet includes a resin layer and a first adhesive layer. The resin layer is releasable from the press through package and includes slits from which the resin layer starts to be released. The first adhesive layer is bonded to the resin layer such that a surface of the first adhesive layer that is an opposite side from the resin layer is to be bonded to the cover.

8 Claims, 13 Drawing Sheets

(51) Int. Cl.
*B32B 7/06* (2019.01)
*B32B 7/12* (2006.01)
*B32B 15/08* (2006.01)
*B65D 75/32* (2006.01)
*B65D 77/20* (2006.01)

(52) U.S. Cl.
CPC ............ *B32B 15/08* (2013.01); *B65D 75/327* (2013.01); *B65D 77/2024* (2013.01); *B32B 2250/02* (2013.01); *B32B 2439/00* (2013.01); *B65D 2577/2025* (2013.01)

(58) Field of Classification Search
CPC ...... B65D 75/32; B65D 75/327; B65D 77/20; B65D 77/2024; B65D 83/04; B65D 83/0445
USPC .................................. 206/531–532, 538–539
See application file for complete search history.

(56) References Cited

U.S. PATENT DOCUMENTS

| | | | |
|---|---|---|---|
| 2004/0178112 | A1 | 9/2004 | Snyder |
| 2007/0241552 | A1* | 10/2007 | Watson ................ B65D 75/367 206/531 |
| 2018/0012117 | A1* | 1/2018 | Forster ............. G06K 19/07726 |

FOREIGN PATENT DOCUMENTS

| | | | |
|---|---|---|---|
| JP | 2003-237836 A | 8/2003 |
| JP | 2005-082179 A | 3/2005 |
| JP | 2005-520747 A | 7/2005 |
| JP | 2007-60407 A | 3/2007 |
| JP | 2014-176597 A | 9/2014 |
| JP | 2019-215424 A | 12/2019 |

OTHER PUBLICATIONS

International Search Report and Written Opinion of the International Searching Authority (ISR-WO) corresponding to counterpart International Patent Application PCT/JP2022/023080 mailed Aug. 30, 2022, English translation.

* cited by examiner

PROTECTION SHEET, PRESS THROUGH PACKAGE

This application is a national phase of International Application No. PCT/JP2022/023080 filed Jun. 8, 2022, which claims priority to Japanese Application No. 2021-095632 filed Jun. 8, 2021, each of which is incorporated herein by reference in its entirety.

TECHNICAL FIELD

The present technology relates to a protection sheet and a press through package.

BACKGROUND ART

Conventionally, a press through package (PTP) has been known as a packaging material that includes storing portions storing objects such as medical tablets. Child-resistant functions have been recently proposed for the PTP such that the packaging material is not opened by children by mistake. One example is disclosed in Patent Document 1. A PTP (PTP packaging body) described in Patent Document 1 includes a base layer and a cover. The base layer includes an aluminum foil that can be pressed and broken. The cover includes a cover film that is disposed on the base layer so as to be releasable from the base layer. A non-adhesive section where no adhesive treatment is provided is formed on an interface portion between the base layer and the cover film in an edge portion of the cover. In opening the PTP, the portion of the cover film including the non-adhesive section is used as a holding portion such that children cannot open the PTP easily.

PRIOR ART DOCUMENT

Patent Document

Patent Document 1: Japanese Unexamined Patent Application Publication No. 2005-82179

Problem to be Solved by the Invention

However, in the PTP described in Patent Document 1, the cover has a complicated layered structure and therefore, the producing process also becomes complicated. Releasing may be caused on the interface between other layers (for example, between the aluminum foil of the base layer and adjacent layer) other than the bonded portion where the holding portion of the cover film and the base layer are bonded. The cover may not be released stably.

SUMMARY OF THE INVENTION

The present technology was made in view of the above circumstances. An object is to achieve a child-resistant function with a simple configuration.

Means for Solving the Problem

Means for solving the problem is described below.
<1> A protection sheet is to be attached to a press through package that includes a sheet-shaped container including storing portions and a cover that seals the storing portions. The protection sheet includes a resin layer and a first adhesive layer. The resin layer is releasable from the press through package and includes slits from which the resin layer starts to be released. The first adhesive layer is bonded to the resin layer such that a surface of the first adhesive layer that is an opposite side from the resin layer is to be bonded to the cover.
<2> In the protection sheet according to <1>, every two slits of the slits are provided for each of the storing portions so as to be opposite each other and sandwich a portion of the resin layer overlapping a corresponding storing portion in a plan view, and each of the slits has an elongated shape and extends from a portion of an outer edge of the resin layer in a direction that crosses the outer edge.
<3> In the protection sheet according to <2>, a cut portion is on a surface of the resin layer opposite the first adhesive layer and the cut portion extends to connect extending ends of the every two slits.
<4> In the protection sheet according to <2> or <3>, the resin layer has a rectangular planar shape as a whole, and each of the slits extends from a portion of a long side included in the outer edge along a short-side direction.
<5> In the protection sheet according to <2> or <3>, the resin layer has a rectangular planar shape as a whole, and each of the slits extends from a portion of a short side included in the outer edge along a long-side direction.
<6> In the protection sheet according to any one of <1> to <5>, the first adhesive layer is an adhesive agent or an adhesive tape that includes acryl-based material, urethane-based material, silicon-based material, or a rubber-based material.
<7> The protection sheet according to any one of <1> to <6> further includes a metal layer disposed on an opposite side from the first adhesive layer with respect to the resin layer, and an IC mounted on the metal layer to overlap at least a portion of one of the slits in a plan view, the IC being for communicating with an external device.
<8> The protection sheet according to any one of <1> to <7> further includes a release paper that is disposed on an opposite side from the resin layer with respect to the first adhesive layer and to be released from the first adhesive layer before being attached to the cover such that the first adhesive layer is uncovered.
<9> A press through package includes the protection sheet according to any one of <1> to <7>.
<10> the press through package according to <9>, the protection sheet has a planar shape and a planar size that are substantially same as those of the sheet-shaped container and the cover.

Effects of the Invention

According to the present technology, a child-resistant function can be achieved with a simple configuration.

MODES FOR CARRYING OUT THE INVENTION

First Embodiment

A first embodiment will be described with reference to FIGS. 1 to 7. In this embodiment section, a protection sheet 30A and a press through package 10 (PTP, one example of a packaging material) to which the protection sheet 30A is attached will be described. An X-axis, a Y-axis and a Z-axis may be present in each of the drawings and each of the axial directions represents a direction represented in each drawing.

Figure 1:
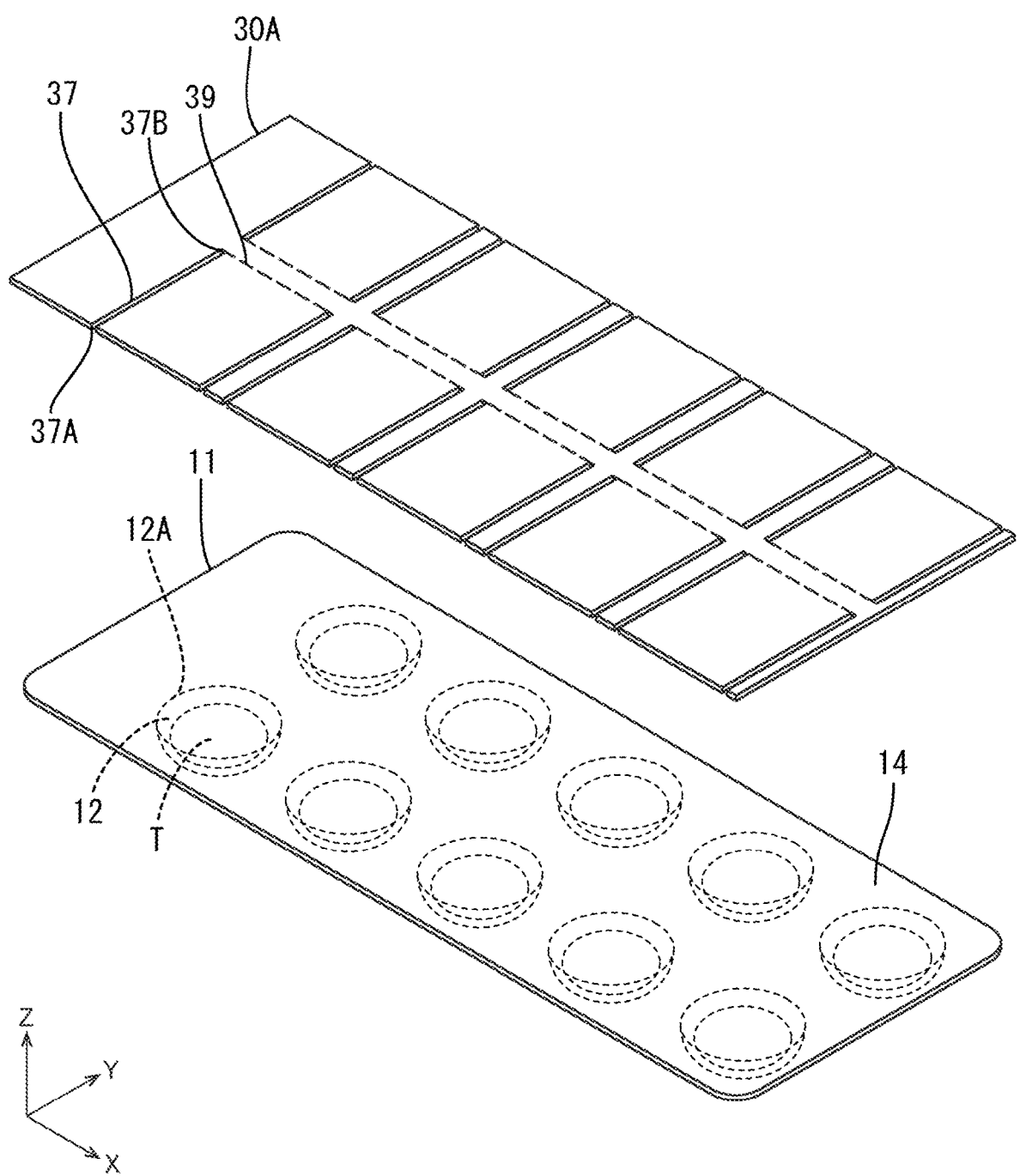
FIG. 1 is an exploded perspective view of a PTP according a first embodiment.
Figure 2:
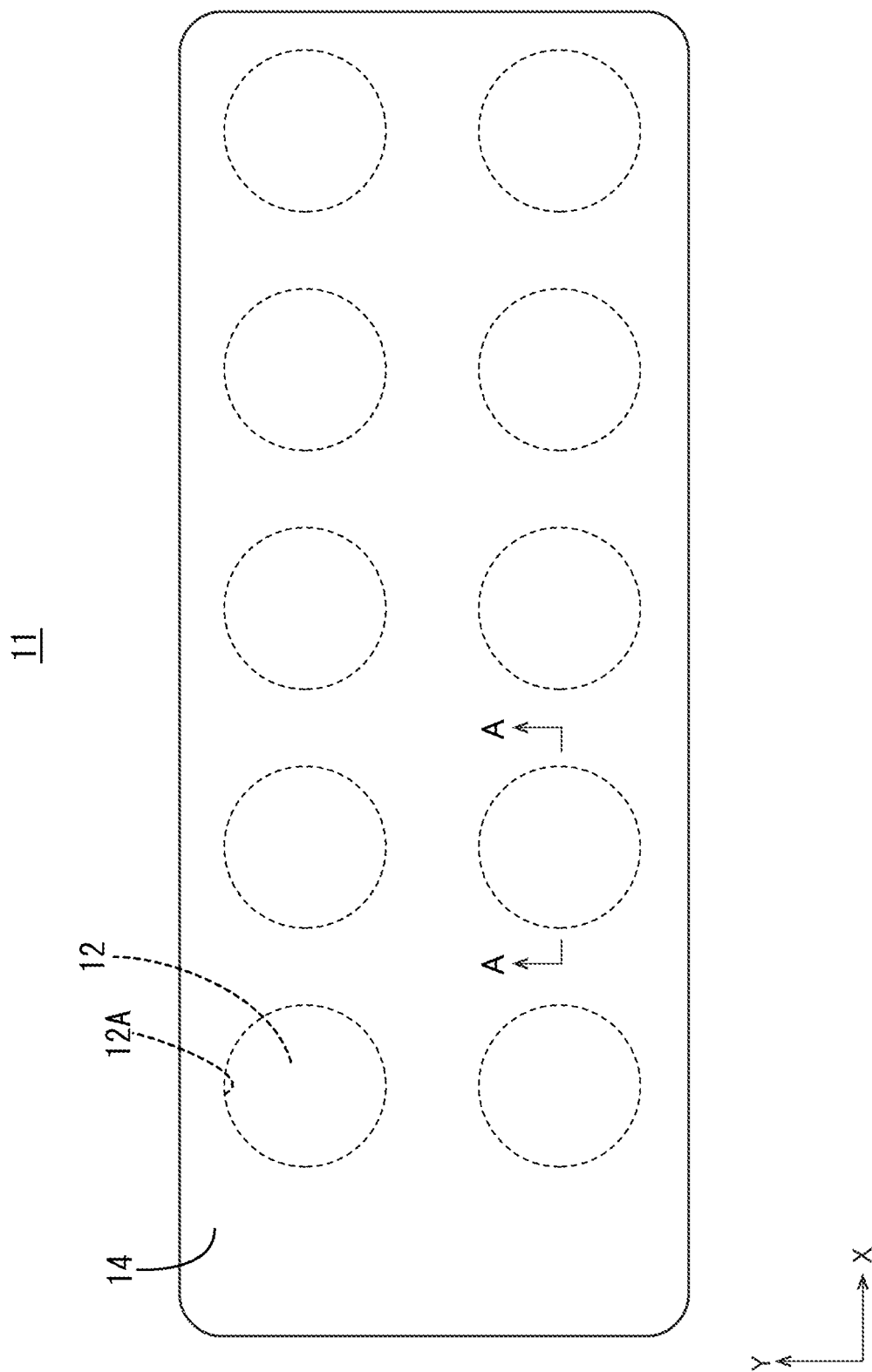
FIG. 2 is a plan view of a PTP body portion.
Figure 3:
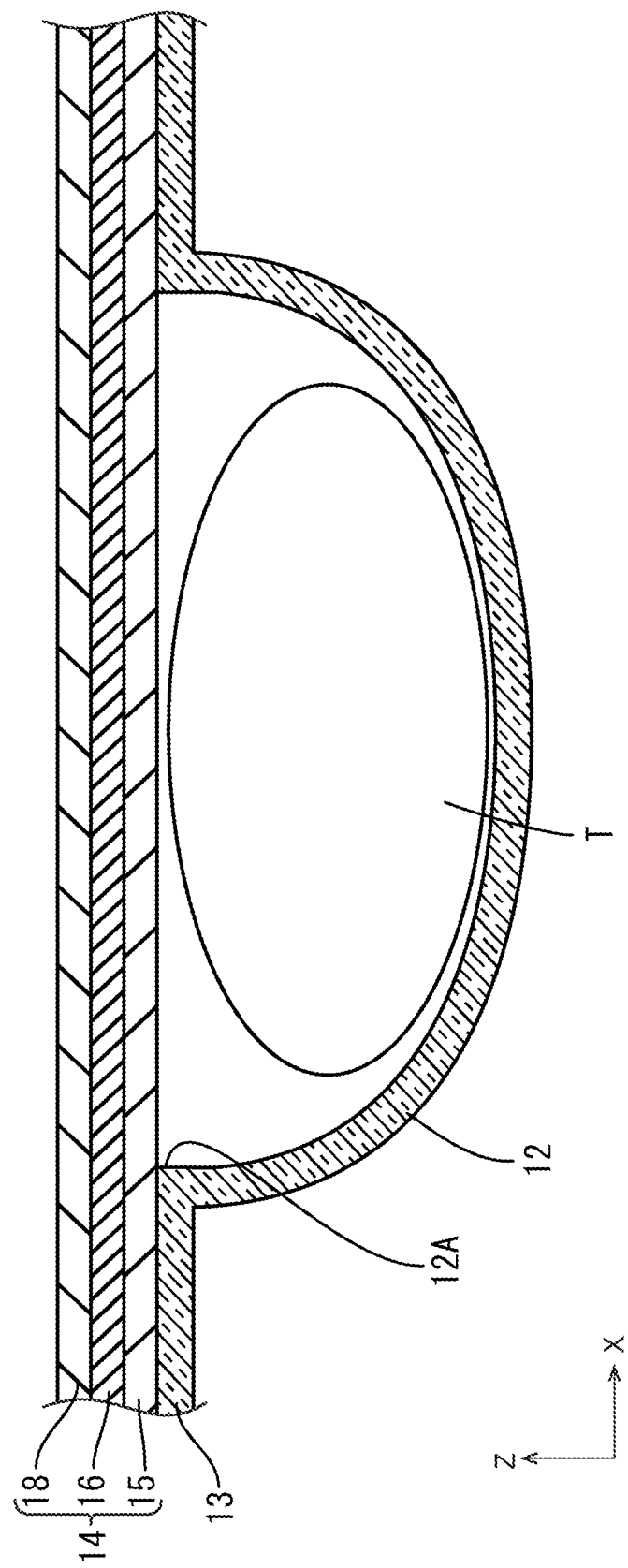
FIG. 3 is a cross-sectional view taken along A-A line in FIG. 2.

As illustrated in FIG. 1, the PTP 10 includes a PTP body portion 11 that stores objects T (medical tablets) and a protection sheet 30A that is attached to the PTP body portion 11. As illustrated in FIGS. 2 and 3, the PTP body portion 11 includes a sheet-shaped container 13 and a cover 14. The sheet-shaped container 13 includes storing portions 12 in which the objects T are stored. The cover 14 is attached to cover openings 12A of the storing portions 12 and the storing portions 12 are sealed. The PTP body portion 11 has a parallelopiped (rectangular) plan view shape and the protection sheet 30A also has a plan view shape similar to that of the PTP body portion 11. The protection sheet 30A has a plan view size such that the whole PTP body portion 11 can be covered. In this embodiment, the protection sheet 30A and the PTP body portion 11 have a substantially same plan view size.

As illustrated in FIGS. 2 and 3, the sheet-shaped container 13 includes the storing portions 12 that are recessed (project in a semispherical shape) to be away from the cover 14. The sheet-shaped container 13 is formed by processing a resin sheet having a thickness of from about 60 µm to 400 µm into a predefined shape. The sheet-shaped container 13 is a known resin container for a PTP and made of transparent thermoplastic resin such as polyvinyl chloride, polyvinylidene chloride, polypropylene, and amorphous polyethylene terephthalate. Each storing portion 12 has a circular plan view shape following the shape of the object T. In this embodiment, five storing portions 12 are arranged at predefined intervals in an X-axis direction (a long side direction) and two storing portions 12 are arranged at predefined intervals in a Y-axis direction (a short side direction). A total of ten storing portions 12 are formed.

The cover 14 is a flat sheet member and made of thin material that can be pressed to release the object. Portions of the cover 14 other than the portions covering the openings 12A of the storing portions 12 are bonded to the sheet-shaped container 13 as illustrated in FIG. 3. The cover 14 includes a heat sealing adhesive layer 15, an aluminum foil 16, and an overcoat layer 18 that are disposed on top of each other from the sheet-shaped container 13 side. The cover 14 is bonded to the sheet-shaped container 13 with the heat sealing adhesive layer 15 such that the storing portions 12 are sealed. The heat sealing adhesive layer 15 is a known thermal agent for a PTP. For example, polyester-based adhesive, polypropylene-based adhesive, and vinyl chloride-based adhesive may be used. The overcoat layer 18 is a protection layer made of transparent resin and protects the aluminum foil 16.

Figure 5:
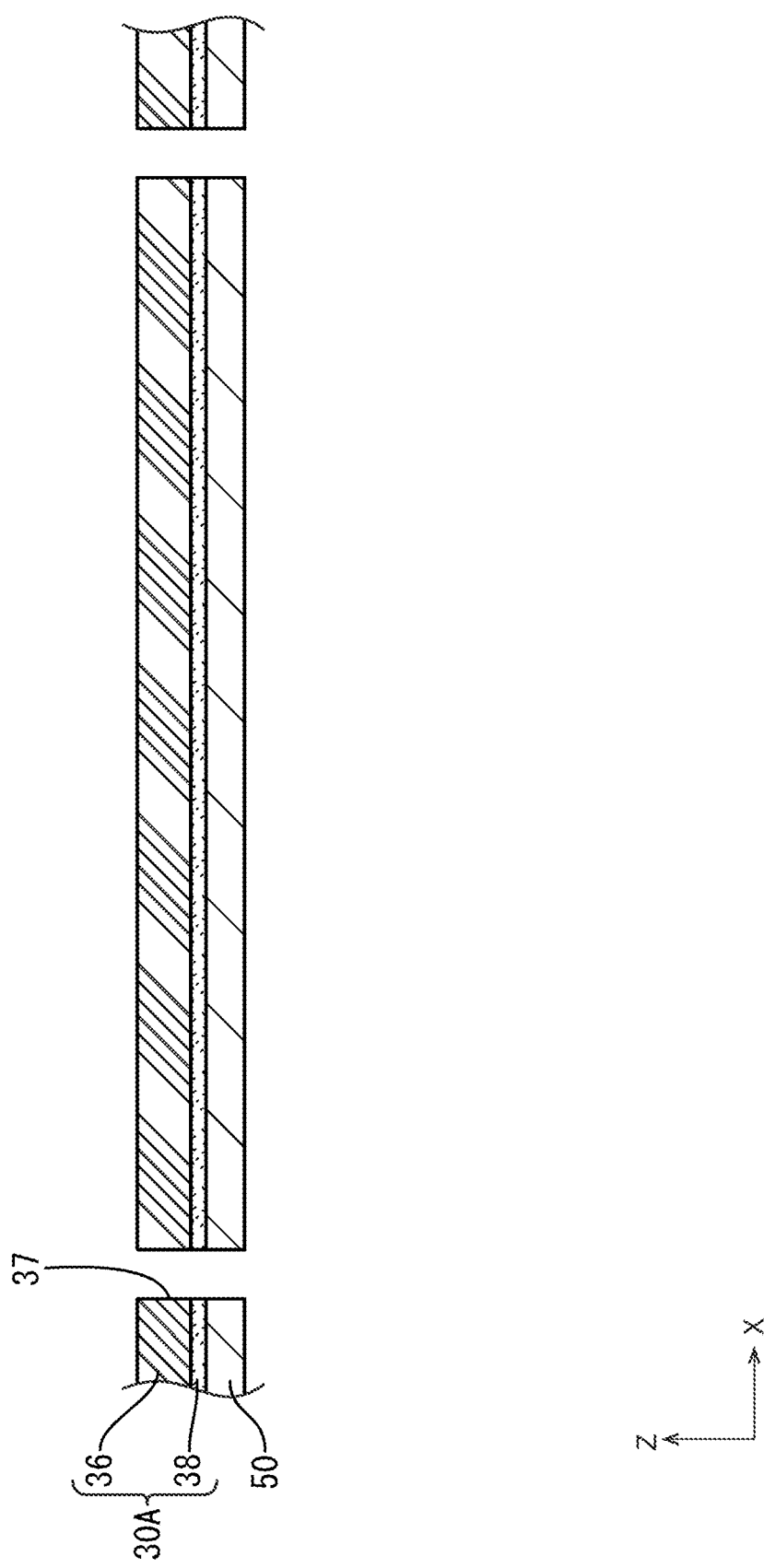
FIG. 5 is a cross-sectional view taken along B-B line in FIG. 4.
Figure 6:
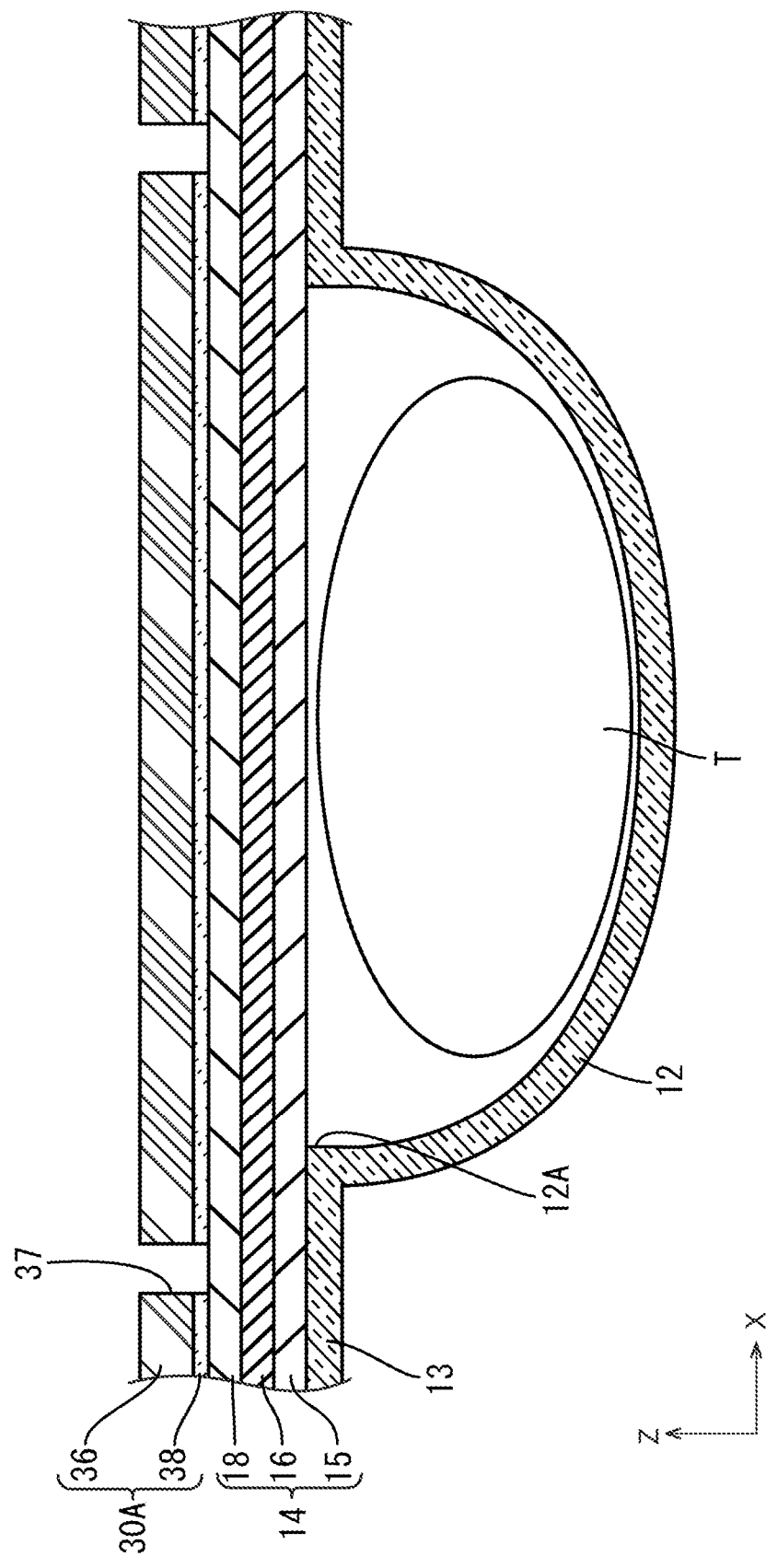
FIG. 6 is a cross-sectional view of the PTP taken along a position of B-B line in FIG. 4.

As illustrated in FIG. 1, the protection sheet 30A is attached to a sheet surface of the cover 14 of the PTP body portion 11. As illustrated in FIG. 5, a release paper 50 is attached to a surface of a low adhesive layer 38 (one example of a first adhesive layer) that includes a surface configured as a lower surface of the protection sheet 30A before the protection sheet 30A is attached to the cover 14. The low adhesive layer 38 is uncovered by releasing the release paper 50 from the low adhesive layer 38. As illustrated in FIG. 6, the uncovered low adhesive layer 38 is attached to the cover 14. In this description, the opening detection sheet from which the release paper 50 is released is represented by a reference sign of 30A and the opening detection sheet before the release paper 50 is released is represented by a reference sign of 30. With the release paper 50, the opening detection sheet 30 can be stored and transferred as a single object (a separate object) before being attached to the PTP body portion 11.

As illustrated in FIGS. 5 and 6, the protection sheet 30A is a layered member including a resin layer 36 and the low adhesive layer 38. As illustrated in FIG. 6, the resin layer 36 and the cover 14 of the PTP body portion 11 are bonded to each other with the low adhesive layer 38. The resin layer 36 and the release paper 50 are releasably bonded to each other with the low adhesive layer 38 before the protection sheet 30A is bonded to the PTP body portion 11. The low adhesive layer 38 is adhesive agent or an adhesive tape made of acryl-based material, urethane-based material, silicon-based material, or rubber-based material. The resin layer 36 is a resin sheet that can be bonded to the low adhesive layer 38 and is made of resin such as polyethylene terephthalate (PET), polystyrene, polyurethane, polypropylene, and polyimide. The resin layer 36 preferably has a predefined thickness or more so as to be easily held by a user when the resin layer 36 is released.

Figure 4:
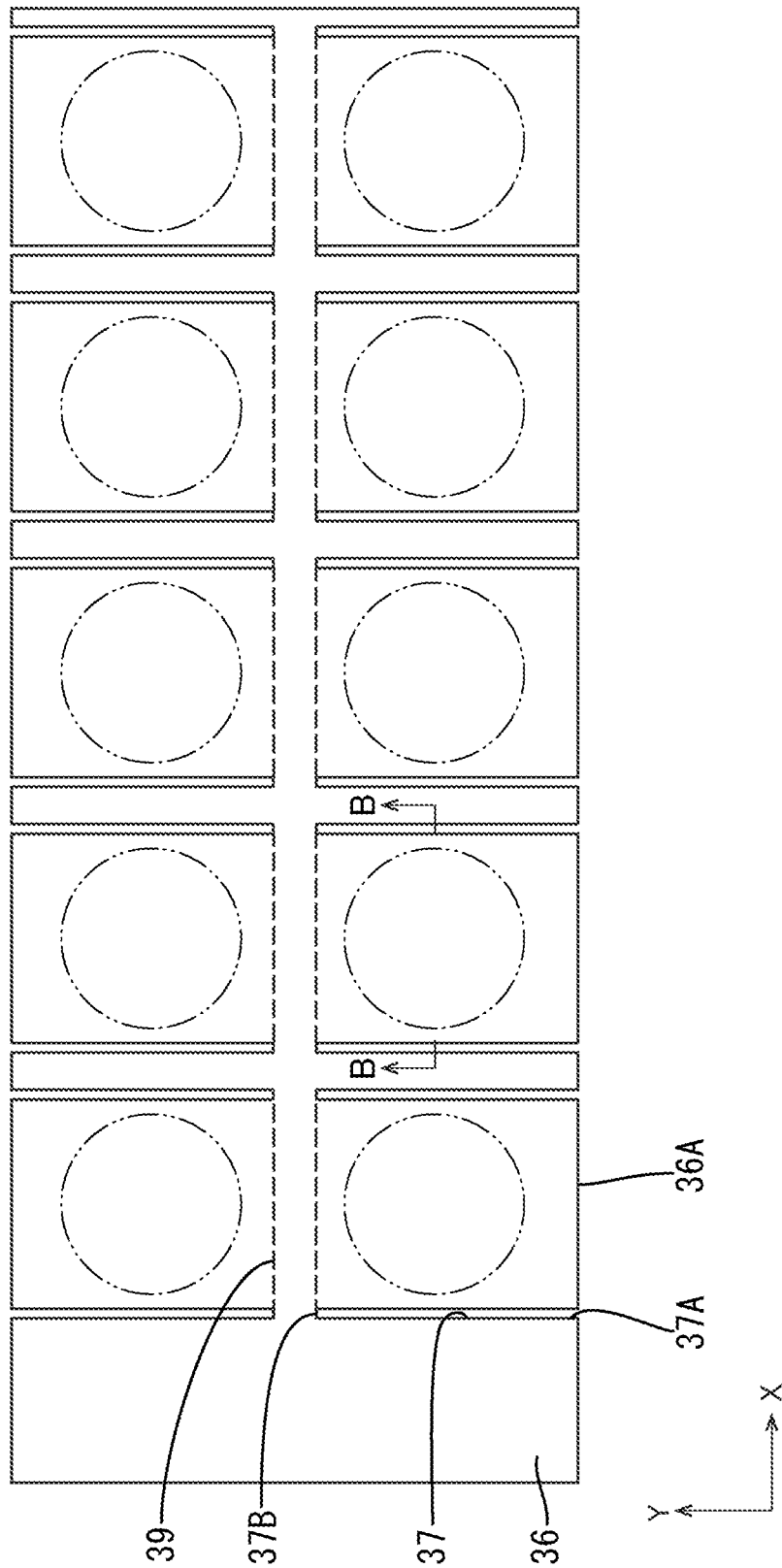
FIG. 4 is a plan view of a protection sheet.
Figure 7:
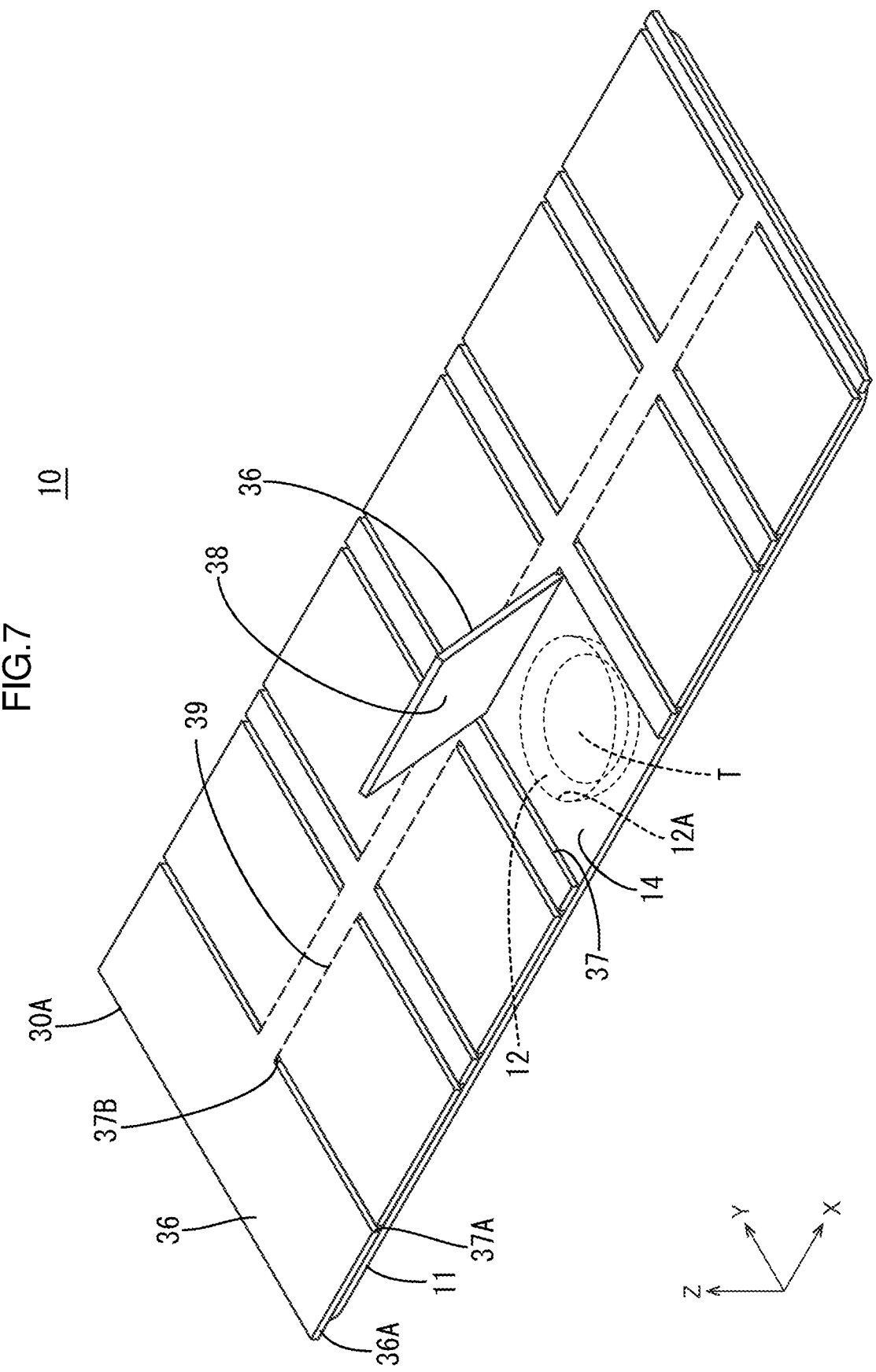
FIG. 7 is a perspective view of the PTP from which the protection sheet is released.

As illustrated in FIGS. 4 and 6, the resin layer 36 and the low adhesive layer 38 include first slits 37 and half cutting portions 39. The first slits 37 are through the resin layer 36 and the low adhesive layer 38; however, the first slit 37 may necessarily be through at least the resin layer 36. The resin layer 36 has a rectangular plan view shape having long sides and short sides and includes an outer edge 36A. Each first slit 37 extends from the long side of the outer edge 36A along a short side direction (a direction crossing the long side of the outer edge 36A). Each first slit 37 extends in a thin elongated shape (specifically, in an I-shape). One end 37A of each first slit 37 is at the outer edge 36A of the resin layer 36. With such a configuration, a user can use the one end 37A as a starting point of releasing and release the resin layer 36 from the one end 37A side along the first slit 37. Two first slits 37 are provided for each of the storing portions 12 in a surface area of the resin layer 36. Every two first slits 37 are disposed to be opposite each other so as to sandwich a portion of the resin layer 36 that overlaps the outer edge (an opening edge of the opening 12A) of the storing portion 12. With such a configuration, as illustrated in FIG. 7, a user can easily peel and release the protection sheet 30A that covers a desired one of the storing portions 12 to be opened.

As illustrated in FIG. 4, a cut portion 39 (so-called half cutting portion) is formed in the resin layer 36 and the low adhesive layer 38. The cut portion 39 extends to connect extending ends 37B (another end) of the respective two first slits 37 that are provided for every storing portion 12. The half cutting portion 39 is formed by cutting through the low adhesive layer 38 in an entire thickness and cutting the resin layer 36 in a half thickness from a low adhesive layer 38 side surface. Accordingly, as illustrated in FIG. 7, when the protection sheet 30A that covers the desired storing portion 12 to be opened is peeled and released, the released portion is easily bent along the half cutting portion 39 and the cover 14 is easily kept in an uncovered state.

According to the PTP 10 previously described, a user releases the protection sheet 30A that covers the desired storing portion 12 and then, presses the object T in the desired storing portion 12 toward the cover 14 to break the cover 14. Thus, the PTP 10 can be opened. To open the PTP 10, two operations of peeling and pushing are necessary and therefore, children are less likely to open the PTP 10 by mistake and the child-resistant function can be achieved. The operation of peeling that is additionally performed to achieve the child-resistant function can be performed easily with the first slits 37 and the half cutting portion 39 and therefore, it is not a troublesome operation for a user. The PTP 10 is a packaging material that cannot be easily opened by children but can be opened by a user (an adult) without difficulty.

The protection sheet 30A has a layered structure that is not complicated and can be widely used for (attached to) the PTP body portion 11, which is generally used. Therefore, the process of producing the protection sheet 30A and the PTP 10 is not complicated. With the protection sheet 30A, the child-resistance function can be achieved with a simple configuration.

Second Embodiment

A protection sheet 130A according to a second embodiment and a PTP 110 to which the protection sheet 130A is attached will be described with reference to FIGS. 8 and 9. The protection sheet 130A differs from the first embodiment in the following points. The protection sheet 130A includes an upper high adhesive layer 34A, a base layer 35, a lower high adhesive layer 34B, and a metal layer 32 that are disposed on top of each other on the resin layer 36 and ICs (integrated circuits) 40 that are for communicating with an external device are mounted on the metal layer 32. In the second embodiment, configurations, operations, and effects same as those of the first embodiment will not be described.

Figure 8:
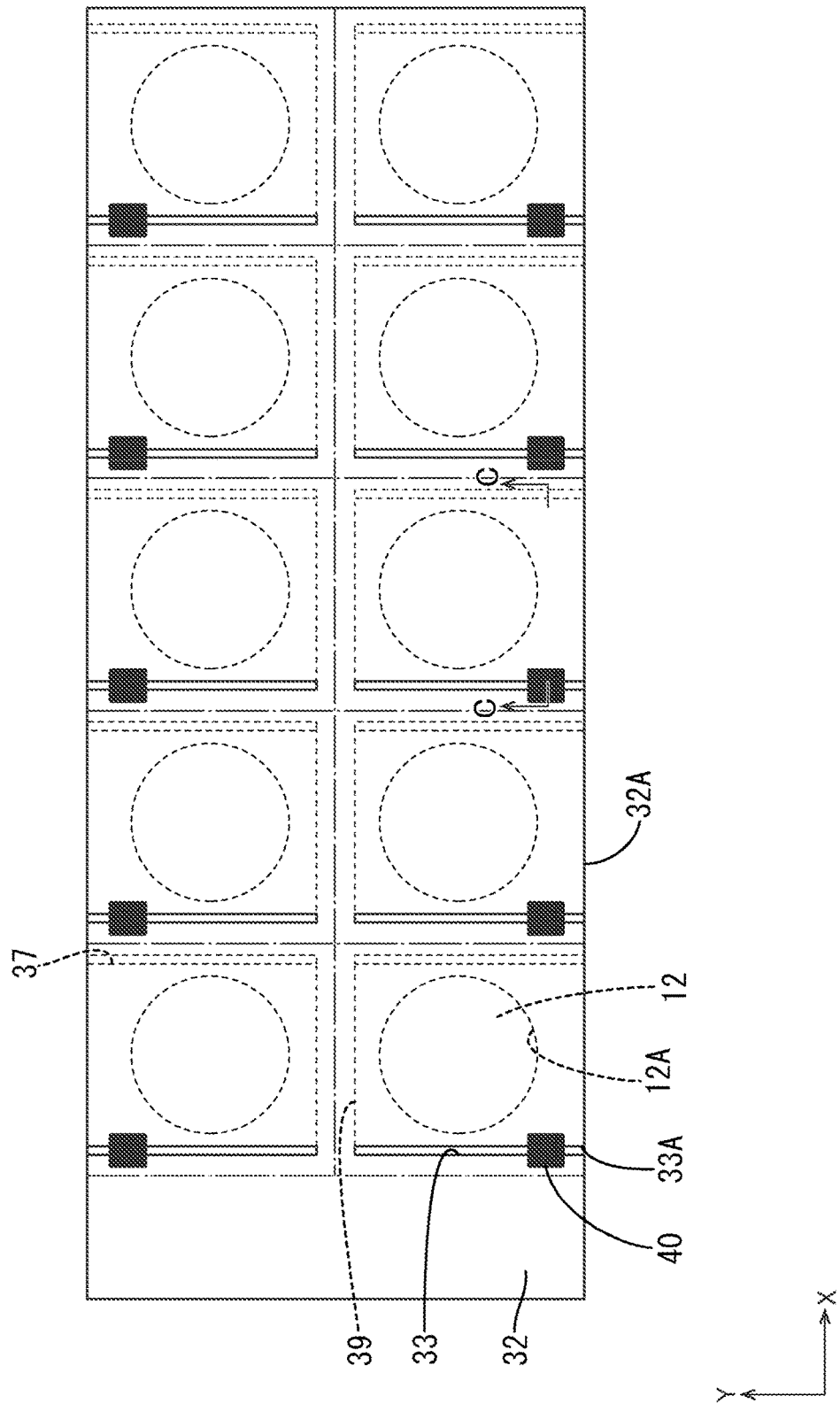
FIG. 8 is an upper view of a PTP according to a second embodiment.
Figure 9:
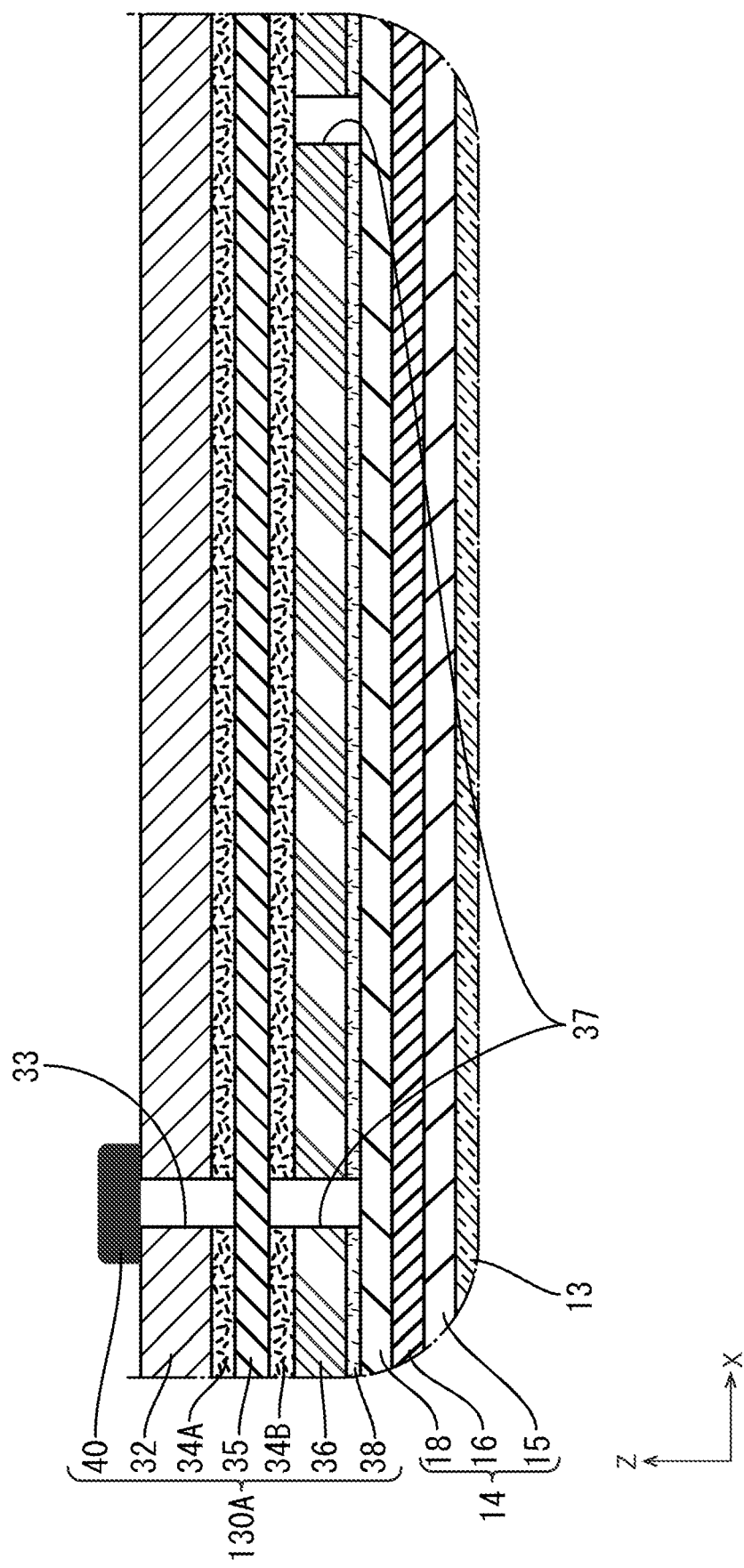
FIG. 9 is a cross-sectional view taken along C-C line in FIG. 8.

As illustrated in FIG. 9, the protection sheet 130A includes the low adhesive layer 38, the resin layer 36, the lower high adhesive layer 34B, the base layer 35, the upper high adhesive layer 34A, and the metal layer 32 that are disposed on top of each other in this sequence from the lower side (PTP body portion 11 side). The metal layer 32 is an aluminum layer, for example, and is an antenna wire layer including a wire that is configured as an antenna. The antenna wire may be formed in a unitary form in an entire area of the metal layer 32 or multiple antenna wires may be formed in divided areas of the metal layer 32, respectively. With the antenna wires being formed in the respective divided areas, as illustrated with one dot chain lines in FIG. 8, the area of the metal layer 32 may be divided into rectangular sections corresponding to the respective storing portions 12 and the antenna wire may be formed in each of the divided sections (for example, ten sections in this embodiment).

The PTP 110 is configured to perform wireless communication with an external communication device via the metal layer 32 (the antenna wire layer) and the ICs 40. The ICs 40 and the antenna included in the metal layer 32 are configured to receive a signal transmitted by the external communication device and send a signal to the external communication device in response to the receiving of the signal. A near field communication technology such as radio-frequency identification may be used as a wireless communication method; however, the communication method is not particularly limited.

As illustrated in FIG. 8, the metal layer 32 includes second slits 33 (ten second slits 33 in this embodiment) having a thin elongated plan view shape (specifically an I-shape). One second slit 33 is formed for each storing portion 12. As illustrated in FIGS. 8 and 9, the second slit 33 overlaps one of the two first slits 37, which are provided for every storing portion 12, in a plan view. Each second slit 33 extends from an outer edge 32A of the metal layer 32 in a form of an I-shape. Each second slit 33 extends through the metal layer 32 and the upper high adhesive layer 34A. In this embodiment, each second slit 33 extends in the I-shape until it overlaps the half cutting portion 39. However, the second slit 33 may not necessarily extend to the half cutting portion 39 as long as the second slit 33 overlaps a portion of the first slit 37 in a plan view.

As illustrated in FIG. 8, the base layer 35 is bonded to the metal layer 32 with the upper high adhesive layer 34A and supports the metal layer 32. With the base layer 35, shape stability of the metal layer 32 and heat resistant property of the metal layer 32 during the manufacturing processing can be improved. The base layer 35 is made of resin material having insulating property. The thickness of the base layer 35 is (for example, from about 25 μm to 50 μm) much smaller than that of the resin layer 36. Specifically, a PET (polyethylene terephthalate) film may be used as the base layer 35.

As illustrated in FIG. 9, the upper high adhesive layer 34A is between the metal layer 32 and the base layer 35 to bond the metal layer 32 and the base layer 35 firmly. The lower high adhesive layer 34B is between the base layer 35 and the resin layer 36 to bond the base layer 35 and the resin layer 36 firmly. The upper high adhesive layer 34A and the lower high adhesive layer 34B are adhesive agent or adhesive tapes made of acryl-based material, urethane-based material, silicon-based material, or rubber-based material. The upper high adhesive layer 34A and the lower high adhesive layer 34B have adhesive force greater than that of the low adhesive layer 38. Specifically, the adhesive force (JIS Z 0237 (2000)) of the lower high adhesive layer 34B with respect to the resin layer 36 is 10 N/25 mm or greater. Accordingly, when the resin layer 36 is released along the first slits 37, the base layer 35 and the metal layer 32 that are firmly bonded to the resin layer 36 are released together with the resin layer 36, and the resin layer 36, the base layer 35, and the metal layer 32 are bent along the half cutting portion 39. A cutting line of perforations may be formed in the base layer 35 to overlap the second slit 33 in a plan view such that the base layer 35 can be broken easily.

As illustrated in FIG. 8, the IC 40 is an IC chip having a rectangular parallelepiped shape. The ICs 40 (ten ICs in this embodiment) are mounted and one IC 40 is mounted corresponding to each second slit 33 (each storing portion 12). The IC 40 is mounted on the metal layer 32 so as to cover a portion of the second slit 33. A terminal of each IC 40 is connected to a wire that is configured as the antenna formed in the metal layer 32. In this embodiment, the IC 40 is disposed to cover a portion of the second slit 33 closer to one end portion 33A (an end portion closer to the outer edge 32A) of the second slit 33; however, the IC 40 may be disposed to cover other portion of the second slit 33. With the second slit 33 having a smaller length, the IC 40 may be disposed to entirely cover the second slit 33.

According to the PTP 110 having the above configuration, the opening detection function can be achieved in addition to the child-resistant function similar to the first embodiment. More specifically, with the resin layer 36 and the metal layer 32 being released along the first slits 37, the terminal of the IC 40 is separated from the metal layer 32 and the IC 40 is disconnected from the antenna wire in the metal layer 32 and becomes in a non-conductive state and no communication is possible between the IC 40 and the external communication device. Accordingly, the external communication can determine whether the releasing is performed or not and the opening is detected or not by determining whether or not a predetermined signal is received.

The resin layer 36 is disposed between the cover 14 (the aluminum foil 16) of the PTP body portion 110 and each of the metal layer 32 (the antenna wire layer) and the ICs 40 that are mounted on the metal layer 32. According to such a configuration, electromagnetic interference that is caused between them when the communication is performed for the opening detection is suppressed by the insulation effects of the resin layer 36. As a result, the communication performance is less likely to be lowered and the opening detection can be performed properly. Therefore, with the PTP 110, the opening detection function having excellent communication performance can be achieved.

Other Embodiments

The present invention is not limited to the embodiments described above with reference to the drawings. For example, the following embodiments may be included in the technical scope of the present invention.

Figure 10:
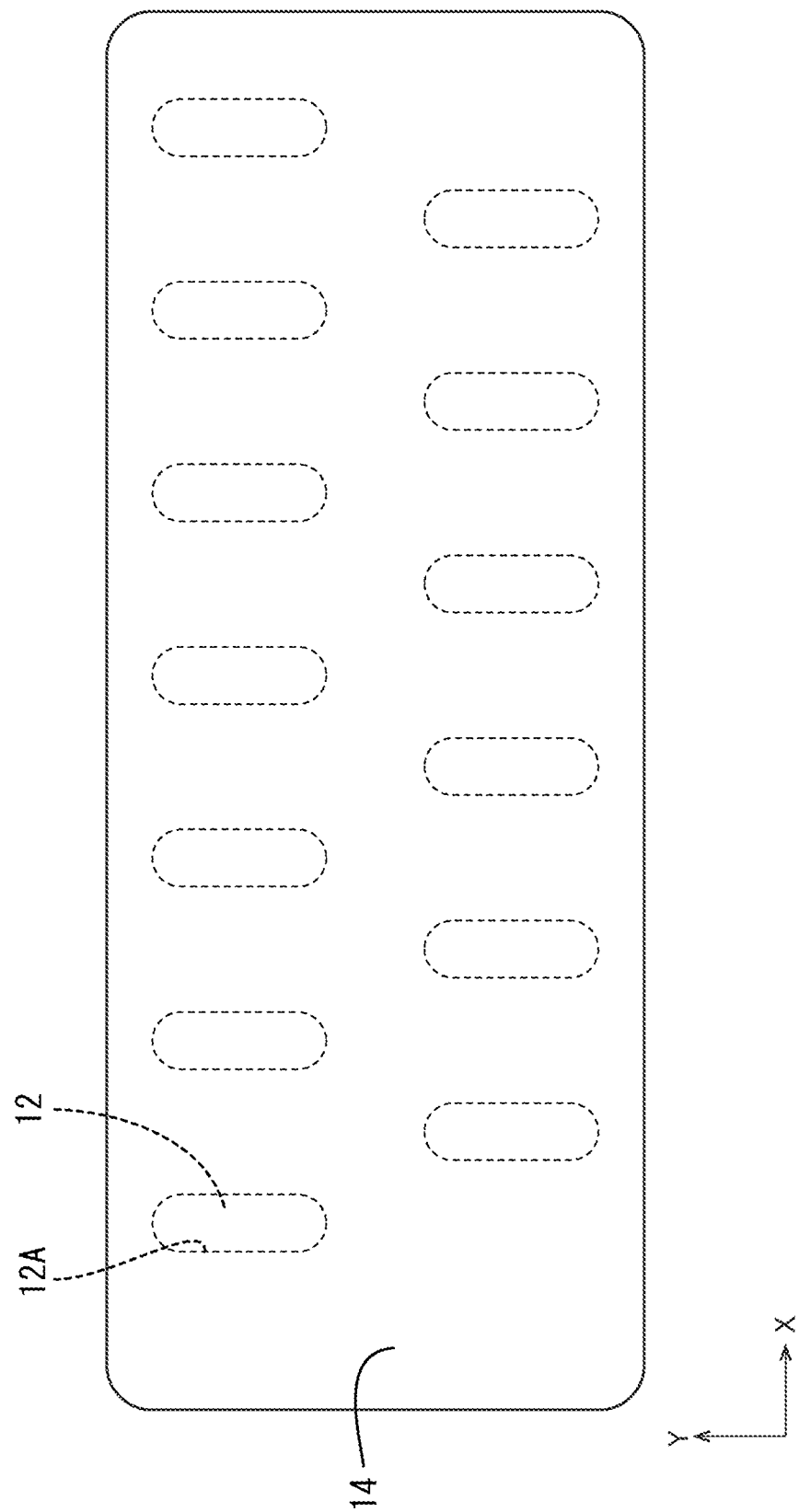
FIG. 10 is a plan view of a PTP body portion according to another embodiment.
Figure 11:
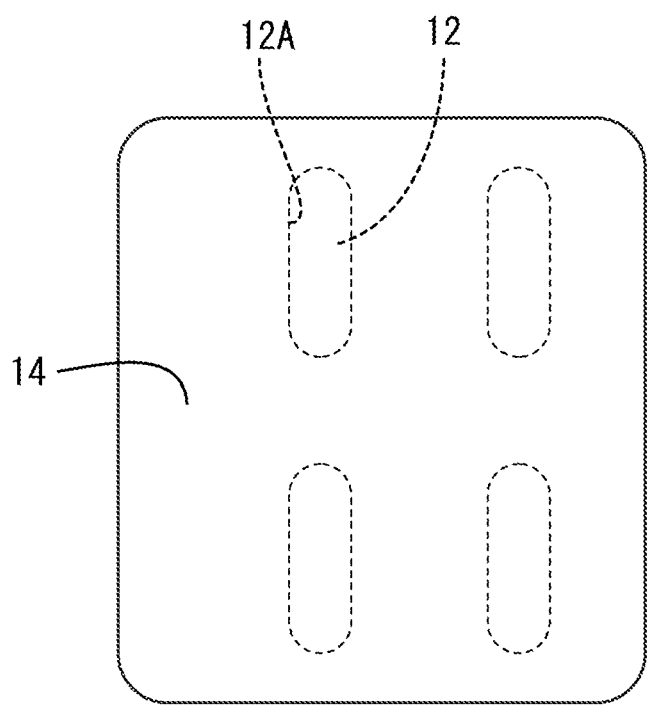
FIG. 11 is a plan view of a PTP body portion according to a further embodiment.
Figure 12:
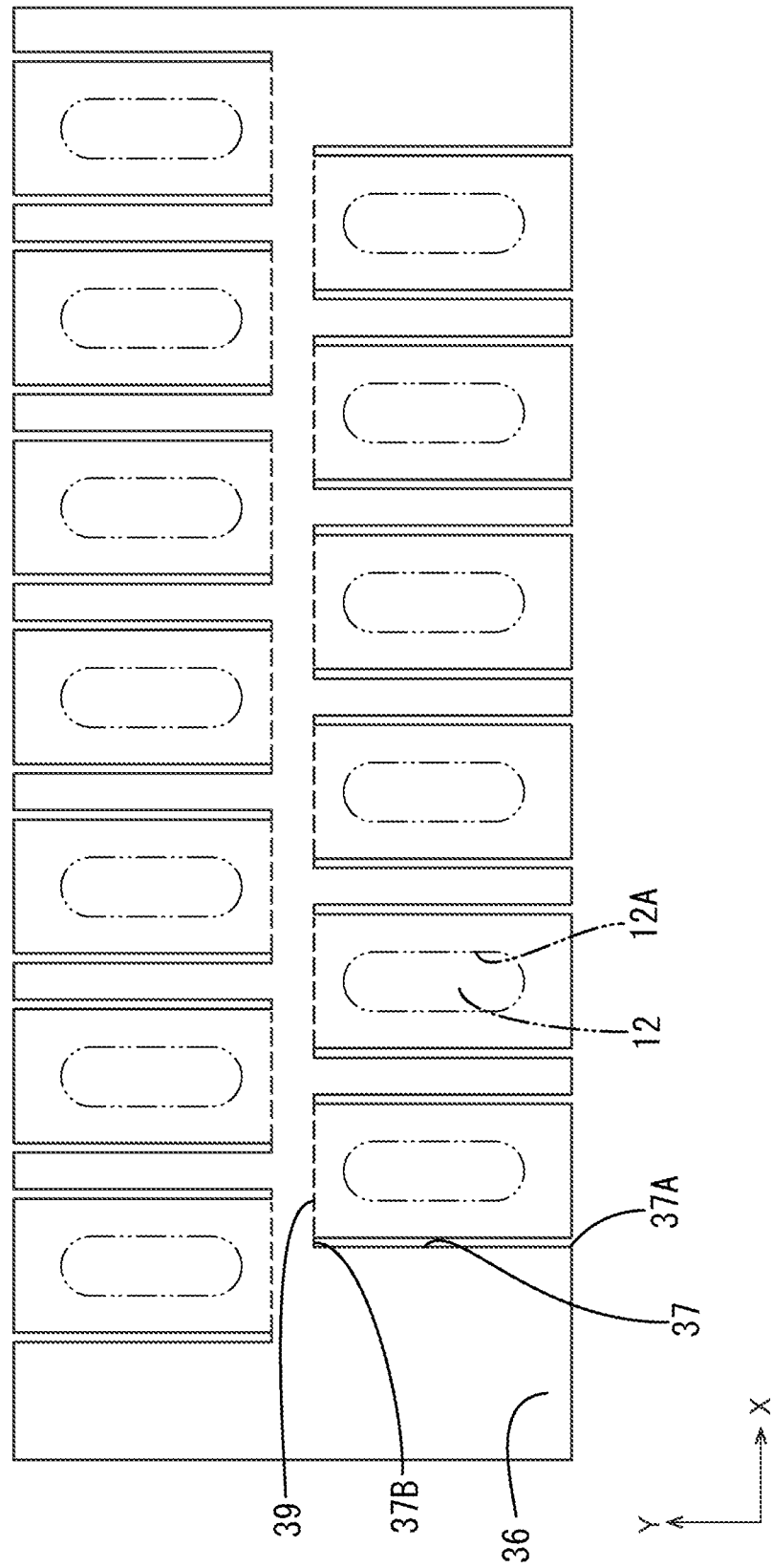
FIG. 12 is a plan view of a protection sheet according to the other embodiment.
Figure 13:
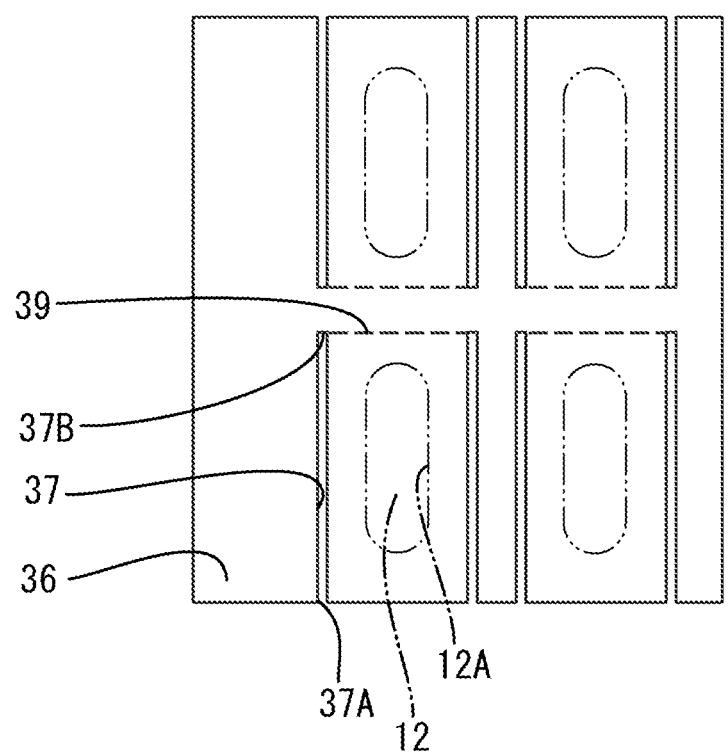
FIG. 13 a plan view of a protection sheet according to the further embodiment.

(1) The shape of the protection sheets 30A, 130A and the number and the positions of the first slits 37 and the second slits 33 may be altered as appropriate according to the shape of the PTP body portion 11 to which the protection sheet is attached and the number and the positions of the storing portions 12. For example, for PTP body portions 211, 311 illustrated in FIGS. 10 and 11, protection sheets 230A, 330A illustrated in FIGS. 12 and 13 may be used, respectively.

(2) The planar shape of the first slit 37 may not be necessarily the I-shape but may be any shapes such as an L-shape and a J-shape as long as the first slit 37 extends until the one end 37A is at the outer edge 36A of the resin layer 36 and such that the first slit 37 extends from the one end 37A and partially along the outer edge (opening edge of the opening 12A) of the storing portion 12. With such a shape, after releasing the protection sheet 30A, 130A, 230A, 330A from the one end 37A side and along the first slits 37, a user can press and break the cover 14 that covers the opening 12A of the storing portion 12.

(3) A planar size of the protection sheet 30A, 130A, 230A, 330A may be greater than that of the PTP body portion 11, 211, 311.

(4) The PTP 10, 110 may be configured to be separated into pieces corresponding to the respective storing portions 12.

EXPLANATION OF SYMBOLS 10, 110: PTP (press through package), 11, 211, 311: PTP body portion, 12: storing portion, 13: sheet-shaped container, 14: cover, 30, 30A, 130A, 230A, 330A: protection sheet, 32: metal layer, 36: resin layer, 37: first slit (slit), 38: low adhesive layer (first adhesive layer), 39: half cutting portion (cut portion), 40: IC, 50: release paper

The invention claimed is:

1. A protection sheet to be attached to a press through package that includes a sheet-shaped container including storing portions and a cover that seals the storing portions, the protection sheet comprising:
   a resin layer being releasable from the press through package and including slits from which the resin layer starts to be released; and
   a first adhesive layer bonded to the resin layer such that a surface of the first adhesive layer that is an opposite side from the resin layer is to be bonded to the cover,
   wherein every two slits of the slits are provided for each of the storing portions so as to be opposite each other and sandwich a portion of the resin layer overlapping a corresponding storing portion in a plan view,
   wherein each of the slits has an elongated shape and extends from a portion of an outer edge of the resin layer in a direction that crosses the outer edge, and
   wherein a cut portion is on a surface of the resin layer opposite the first adhesive layer and the cut portion extends to connect extending ends of the every two slits.

2. The protection sheet according to claim 1, wherein the resin layer has a rectangular planar shape as a whole, and
   each of the slits extends from a portion of a long side included in the outer edge along a short-side direction.

3. The protection sheet according to claim 1, wherein the resin layer has a rectangular planar shape as a whole, and
   each of the slits extends from a portion of a short side included in the outer edge along a long-side direction.

4. The protection sheet according to claim 1, wherein the first adhesive layer is an adhesive agent or an adhesive tape that includes acryl-based material, urethane-based material, silicon-based material, or a rubber-based material.

5. The protection sheet according to claim 1, further comprising:
   a metal layer disposed on an opposite side from the first adhesive layer with respect to the resin layer; and
   an IC mounted on the metal layer to overlap at least a portion of one of the slits in a plan view, the IC being for communicating with an external device.

6. The protection sheet according to claim 1, further comprising a release paper that is disposed on an opposite side from the resin layer with respect to the first adhesive layer and to be released from the first adhesive layer before being attached to the cover such that the first adhesive layer is uncovered.

7. A press through package comprising the protection sheet according to claim 1.

8. The press through package according to claim 7, wherein the protection sheet has a planar shape and a planar size that are substantially same as those of the sheet-shaped container and the cover.

* * * * *